Oct. 25, 1960 R. P. SCHAKE 2,958,041
SUPPRESSED ZERO ELECTRICAL INSTRUMENT
Filed July 3, 1956

RICHARD P. SCHAKE
INVENTOR.

BY
Rudolph L. Junick
ATTORNEY

United States Patent Office 2,958,041
Patented Oct. 25, 1960

2,958,041

SUPPRESSED ZERO ELECTRICAL INSTRUMENT

Richard P. Schake, East Orange, N.J., assignor, by mesne assignments, to Daystrom, Incorporated, Murray Hill, N.J., a corporation of New Jersey Filed July 3, 1956, Ser. No. 595,650

2 Claims. (Cl. 324—131)

This invention relates to electrical indicating instruments and more particularly to an arrangement for obtaining an extreme degree of suppression in an instrument of the permanent magnet, movable coil class.

Suppressed zero instruments are well known in the direct current instrument art. In such instruments, the pointer remains below the lower end of the scale until the current flowing in the movable coil exceeds a predetermined, substantial magnitude.

Permanent magnet, movable coil instruments may be classified in two categories from the standpoint of pointer deflection or scale length. The long scale instruments, having scale lengths of approximately 250 angular degrees, are known as single flux gap instruments. In such instruments the pivotally mounted movable coil is arranged so that only one coil side operates in an arcuate flux gap. The conventional scale instruments, having a scale length of approximately 90°, are arranged in that opposite coil sides operate in two similar flux gaps. The invention to be described hereinbelow is applicable to permanent magnet, movable coil instruments of either class, but the description will be directed specifically to double flux gap instruments having a conventional scale length of approximately 90°.

Suppressed zero instruments are employed when it is desired to read small changes in the measured factor from a normal value, as for example, small variations of a power source potential from a normal value of, say, 50 volts. The normal instrument, having a readable scale of 0–100 volts, can be read with reasonable accuracy to about 0.25 volt when a scale having an arcuate length of 90 degrees is calibrated every degree. A longer scale length would permit a more accurate reading of the voltage values in the desired region about the 50 volts normal value, but the angular displacement of the pointer is definitely limited in conventional permanent magnet, movable coil instruments. In fact, in double flux gap instruments of conventional construction, it is not practical to provide a visible scale longer than 90 degrees. The visible scale, however, can be converted into a much longer fictitious scale of 0–100 volts by suppressing the normal zero position of the movable system. This can be done in several ways.

Mechanical suppression can be obtained by rotating the normal, spiral instrument springs so that the instrument pointer remains below the low end of the visible scale until a substantial voltage, for example, 40 volts, is impressed across the movable coil. The springs and movable coil, in such case, would be designed so that the 50 volt mark falls at the center of the visible scale, and the top scale mark, therefore, would be 60 volts. Each degree of the visible scale thus represents 0.2 volt and, as compared to the initially-assumed 0–100 volt instrument, the full range scale has been expanded to 270 angular degrees and the voltage change within the visible scale range of 40–60 volts can be read with reasonable accuracy to about 0.05 volt. This type of mechanical suppression of the instrument zero point is of limited application because of spring set, friction between the convolution of the spring and non-linearity of spring deflection.

Electrical suppression is also known. In this arrangement a current of known magnitude is passed through a second movable coil to develop an initial, constant, reverse torque that must be overcome by the current flowing through the measuring movable coil. Such arrangement affords greater design latitude but the main objection lies in the requirement for auxiliary equipment in order to check the operating accuracy of the instrument. M. C. Kunz Patent Number 2,459,081, issued January 11, 1949, discloses an electrical suppression arrangement wherein the user may conveniently check the normal, zero-current position of the pointer. Even such arrangement, however, is open to the objection that a source of power, such as a battery, is required as a functional part of the instrument.

An object of this invention is the provision of a method for obtaining an extreme amount of suppression in an electrical instrument of the permanent magnet, movable coil class.

An object of this invention is the provision of an electrical instrument having a pivoted, wire wound movable coil rotatable in a magnetic flux gap and a pair of spiral hair springs for conducting current to the movable coil, the magnetic flux density along the flux gap varying at a predetermined rate with respect to the mechanical torque of the hair springs.

An object of this invention is the provision of an electrical instrument having an extreme amount of suppression, said instrument comprising an arcuate magnetic flux gap, a permanent magnet, means for directing the magnetic lines of force across said flux gap, a pivotally mounted movable coil rotatable in said flux gap, a pointer carried by the movable coil and cooperating with a scale, and spiral springs for conducting current to the movable coil and retaining said coil in a predetermined zero position when no current flows therethrough, said flux gap decreasing in length in the direction of coil travel at a rate not exceeding the restoring force of said springs.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
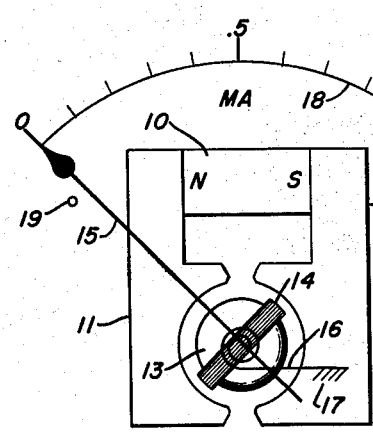
Figure 1 is a more or less diagrammatic illustration showing a conventional permanent magnet, movable coil instrument.

In order to facilitate an understanding of the novel instrument of my invention, reference is first made to the conventional prior art instrument shown in Figure 1 of the drawings which instrument comprises a permanent magnet 10 having a pair of soft-iron pole pieces 11 and 12 secured to the polar faces. The free ends of the pole pieces are formed as cylindrical surfaces and spaced from such surfaces is a cylindrical soft-iron core 13 that is fixed in position by any conventional means. A wire wound movable coil 14 is pivotally mounted for rotation in the symmetrical flux gaps formed between the core and the pole pieces. Such coil carries a pointer 15 and has secured thereto the inner convolution of an upper, spiral spring 16. A similar spiral spring, not shown, is disposed at the bottom of the coil. Those skilled in this art will understand that such spiral springs are electrically insulated from each other and have their free ends independently secured to relatively fixed abutments, such upper abutment being represented diagrammatically at 17. By conventional means, the inner ends of the spiral springs are electrically connected to opposite ends of the movable coil wire and, therefore, serve as a means for connecting the rotatable movable coil to an external circuit. When a direct current is caused to flow through the movable coil the coil will rotate in a clockwise direction whereby the pointer 15 moves over a suitably calibrated scale 18. The spiral springs also serve to provide a restoring force tending to oppose rotation of the movable coil and returning the coil to its normal zero position when the current flow is interrupted. In Figure 1, the coil is shown in such normal zero position with the pointer aligned with the 0 mark on the scale. As is general in instruments of this class, the arcuate length of the scale is 90 angular degrees. If the magnetic flux across the flux gap is uniformly distributed the scale will be uniform.

The visible scale may effectively be lengthened by suppressing the zero coil position. For example, if the spiral springs are wound in a counter-clockwise direction, as by rotating the fixed point 17, the electro-magnetic torque developed by the current flowing in the movable coil must overcome the initial mechanical torque of the coiled springs before actual movement of the coil takes place. Thus, in the illustrated example of Figure 1, if the springs are given an initial tension of 90 angular degrees, a current of 1.0 ma. (equal to the scale range) must flow through the movable coil to align the pointer with the lower scale mark. In effect, the operating range of the instrument has been extended to 2.0 ma. yet the readable accuracy of the visible portion of the scale (1–2 ma.) remains constant. Contrasted to this, a normal instrument having a 90° visible scale calibrated 0–2 ma. would have a readable accuracy of only ½ that of the illustrated 0–1 ma. instrument. However, there is a limit to how far even the best spiral springs can be wound to provide the desired suppression torque. In actual practice, such limit is 2½ times the normal scale length. Therefore, in an instrument having a 90° scale length, such scale can be expanded, by spring suppression, to an effective length of 225°. In practice, also, a suppressed zero instrument is provided with a fixed pointer stop 19 to prevent rotation of the movable coil outside of the effective flux gap.

Figure 2:
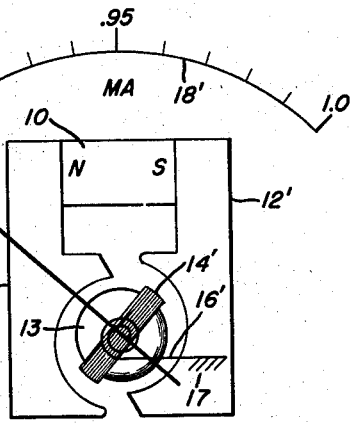
Figure 2 is a similar illustration of an instrument made in accordance with this invention.

Reference is now made to Figure 2 which illustrates an instrument generally similar to the one shown in Figure 1 but which includes a suppression of 9 times the visible scale length. Here, the flux gap, within which the movable coil rotates is non-uniform, that is, the radial length of the gap decreases smoothly in the upscale direction, that is, in the direction of normal coil rotation upon increasing current flow therethrough. The scale 18' has a length of 90° and the movable coil is shown in its normal zero-current position with the pointer resting against the stop 19. It will be noted that the scale is marked 0.9–1.0 ma. from which it will be apparent the instrument is suppressed 9 scale lengths, or 810°. How this is accomplished will be explained in detail with reference to Figure 3. It will further here be noted that although the spring and coil of the instrument of Figure 2 may be the same as those utilized in the instrument of Figure 1, they are designated 16' and 14', respectively, since they may obviously be different therefrom, depending upon the other design parameters of the instrument, such as the flux density in the instrument air gap.

Figure 3:
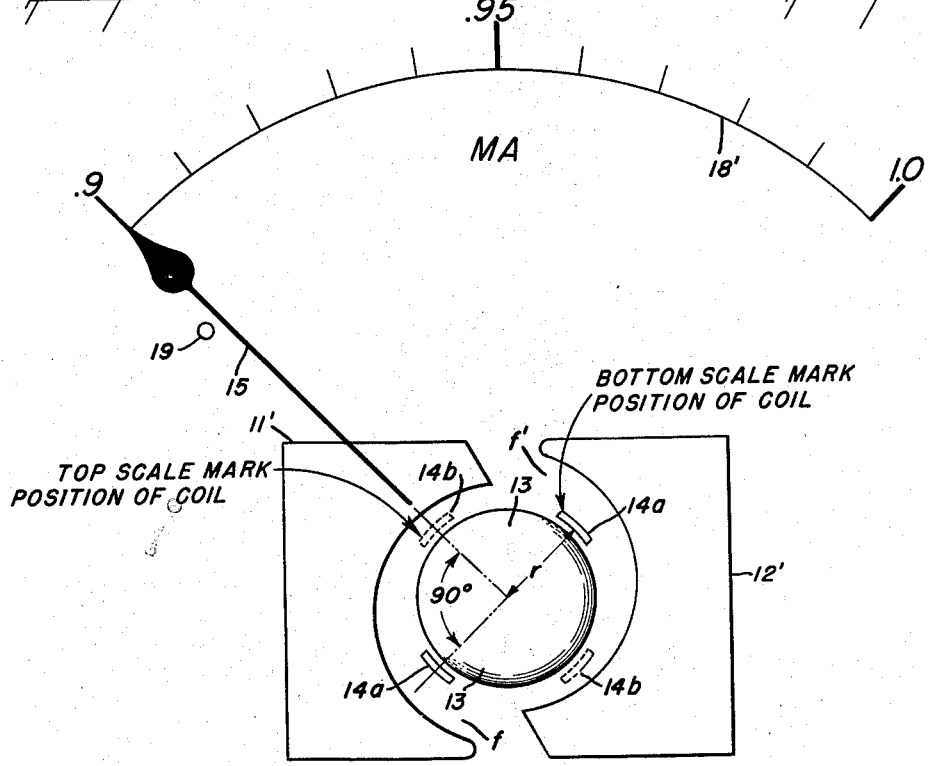
Figure 3 is a fragmentary view, drawn to an enlarged scale, of the Figure 2 instrument and showing only certain components necessary for a description of the invention.

Figure 3 is a fragmentary view, drawn to an enlarged scale, showing only the pole pieces 11', 12' and the cylindrical core 13, scale 18' and a portion of the pointer 15. The vertical sides of the movable coil are shown in two positions. Specifically, the coil sides 14a (drawn in solid lines) represent the position of the movable coil when the pointer 15 is aligned with the bottom mark on the scale, and the coil sides 14b (drawn in dotted lines) represent the position of the coil when the pointer is aligned with the top mark on the scale. The spiral springs (not shown in Figure 3) are wound in a counter-clockwise direction 90° which, as explained hereinabove with reference to Figure 1, would normally provide a suppression of one (1) scale length. Obviously, with such initial tension applied to the spiral springs the normal zero position of the movable coil would be 90° counter-clockwise of the position shown by the coil sides 14a. However, this is prevented by the pointer stop 19.

As an aid to understanding the instrument balance equation which follows, it will be understood that in accordance with well known elementary physical principles, the force on a current-carrying conductor in a magnetic field is proportional to the product of the flux density (B), the length of the conductor (L) and the current (I) in the conductor. The force on each coil side of electrical instruments of the type shown is proportional to the force on a single conductor times the number of turns on the coil. Torque is proportional to the product of force times distance from the axis of rotation; therefore the torque on a coil in an electrical instrument is proportional to the force on the coil sides times the distance of the sides from the instrument axis. Since two sides of the coil are located in a flux gap, the force on each, and the distance thereof from the pivot axis of the instrument must be considered in arriving at the torque of the moving coil. The coil torque is, then, proportional to two times the radius $r$ of the coil times the force on the coil sides. It will be noted that two times the radius $r$, however, equals the breadth of the coil. The breadth of the coil times the length thereof equals the area of the movable coil. Hence, the torque of the coil is proportional to the product of the flux density (B), area, current (I) and the number of turns on the coil. A constant may be included in the coil torque equation depending upon which system of measurements is employed.

It will be noted that the radial lengths of the separate flux gaps $f$, $f'$ decreases smoothly from a maximum value at the bottom scale position of the movable coil to a minimum value of the top scale mark position. Specifically, the length of each flux gap decreases and the magnetic flux density increases in the direction of upscale coil rotation. In order for the movable coil to deflect from the normal zero position, the electromagnetic torque developed by the movable system, hereinafter referred to as the torque of the movable coil, must exceed, to some extent, the mechanical torque of the springs, hereinafter referred to as the spring torque. In a stable instrument these two torques must balance, and the balance equation for instruments of this type is expressed by the relationship, $$T_s = \frac{BAIN}{K} = T_M \qquad (1)$$

where:

$T_s$ = spring torque in milligram centimeters,
$T_M$ = torque of the movable coil in milligram centimeters,
$B$ = magnetic flux density at a particular point in the flux gap, in gauss,
$A$ = area of movable coil, in square centimeters,
$I$ = current flowing in movable coil, in milliamperes,
$N$ = number of turns on movable coil,
$K$ = constant = 9800. (The constant 9800 arises from the particular units of measurement utilized in the expression of the magnetic flux density, coil area, and coil current.)

For simplification, A and N can be designed so that the product thereof equals 9800 whereby the factor $$\frac{AN}{9800} = \frac{9800}{9800} = 1$$

and Equation 1 thereby reduces to, $$T_s = BI$$

or, $$I = \frac{T_s}{B} \quad (2)$$

The spring torque ($T_s$) and the flux density (B) are each at maximum at the top scale mark position of the movable coil. If these value be denoted as 100%, then the current required to align the pointer with the top mark on the scale (which top scale current for purposes of illustration has been chosen as 1 ma.) is, $$I = \frac{100}{100} = 1 \text{ ma.}$$

Since the springs have been given an initial reverse torque of 90° (one scale length) in the instrument shown in Figures 2 and 3, the torque ($T_s$) at the bottom scale mark will be ½ that at top scale mark. If a bottom scale mark of .9 ma. is desired, as illustrated in the instrument of Figures 2 and 3, the flux density at such position which is necessary to align the pointer with the bottom scale mark may be derived by use of Equation 2 above since both the bottom scale torque $T_s$ (in terms of percent of top scale torque) and current $I$ (in terms of percent of top scale current) are known. The flux density at the bottom scale mark position, in terms of percent of flux density at the top scale mark, which is necessary for a .9 ma. bottom scale mark is, $$\frac{50}{90} = 55.6\%$$

where 50 is the percent torque at bottom scale and 90 is the percent current at bottom scale, as compared to full scale torque and current, respectively. Thus, the flux gap at the bottom scale position must be of a suitable length to provide 55.6% of the flux density at the top scale position. In order to obtain a uniform scale as illustrated in Figures 2 and 3, the percent of flux density at each scale mark may be computed in the same manner the bottom scale flux density percentage was computed in the above example, and a smoothly changing flux gap may then be included in the instrument to provide the proper flux density for a uniform scale.

As long as the rate of increase in the torque on the coil due to the increasing flux density, in the upscale direction, is less than the constant rate of increase of the torque of the spiral springs, the instrument is stable and the movable coil will deflect to an extent proportional to the magnitude of the current flowing therethrough.

It will be clear now that an extreme amount of suppression may be obtained in a permanent magnet, movable coil instrument having a normal scale length and made as hereindisclosed. Such suppression is obtained by properly shaping the flux gap and applying some amount of mechanical spring suppression. Instrument suppression of a desired amount may be had by forming the flux gap to obtain a predetermined rate of change of flux density and applying a predetermined amount of initial, reverse spring torque. The limiting factors are the extent to which the particular spiral spring can be wound up (as in a conventional instrument) and the strength of the permanent magnet of given size.

While the invention has been described with specific reference to a double flux gap instrument it will be apparent that the invention is applicable to long scale instruments of the 250° deflection class.

Having given a detailed description of the invention what we desire to protect by Letters Patent is set forth in the following claims.

I claim:

1. In an electrical instrument of the type including an arcuate magnetic flux gap, a pivotally-mounted movable coil rotatable in the flux gap in response to current flow therethrough, spiral springs for conducting current to the movable coil, and a pointer carried by the movable coil and rotatable over a scale having an arcuate length exceeding 70 degrees; the improvement wherein the flux gap progressively decreases in radial length in the upscale direction of movable coil rotation to give an increase in torque on the coil due to the increasing flux density in said upscale direction less than the rate of increase of the torque of the springs, and the springs are set to deflect the movable coil below the lowermost point on the scale when no current flows through the coil.

2. An electrical instrument comprising a permanent magnet; a cylindrical, soft-iron core spaced from the magnet; a pair of soft-iron pole pieces each having one end in contact with opposite polar faces of the magnet, the other ends of the pole pieces including arcuate surfaces spaced from the core with the center of curvature of each arcuate surface being displaced from the core axis to form two flux gaps which vary smoothly in radial length; a movable coil pivoted for rotation in the air gaps coaxially of the core axis, the air gaps decreasing in radial length in the upscale direction of movable coil rotation; spiral springs having inner ends connected to opposite ends of the movable coil and outer ends secured to relatively fixed members; a pointer carried by the movable coil and rotatable over a scale having an arcuate length of substantially 90 degrees; the outer ends of the springs being set so as to depress the pointer below the bottom point of the scale, and the design constants of the instrument conforming to the expression:

$$T_M = \frac{BAIN}{9800}$$

and $$\Delta T_M < \Delta T_S$$

where, $T_M$ = the torque of the movable coil, in milligram centimeters.
$B$ = the magnetic flux density in the flux gap, in gauss,
$A$ = the effective area of the movable coil, in square centimeters,
$I$ = the current passed through the movable coil, in milliamperes,
$N$ = the number of turns on the movable coil,
$\Delta T_M$ = the change in the torque of the movable coil per angular degree, in milligram centimeters, and
$\Delta T_S$ = the change in the torque of the instrument springs per angular degree, in milligram centimeters.

References Cited in the file of this patent

UNITED STATES PATENTS

| | | |
|---|---|---|
| 1,782,588 | Terman | Nov. 25, 1930 |
| 2,139,997 | Carson | Dec. 13, 1938 |
| 2,327,114 | Lingel | Aug. 17, 1943 |
| 2,671,208 | Lamb | Mar. 2, 1954 |

FOREIGN PATENTS

| | | |
|---|---|---|
| 400,651 | Great Britain | Oct. 30, 1933 |
| 482,124 | Great Britain | Mar. 22, 1938 |